US012718423B2

(12) United States Patent
Lubin et al.

(10) Patent No.: US 12,718,423 B2
(45) **Date of Patent: *Aug. 25, 2026**

(54) SYSTEM AND METHOD FOR RETRIEVING AND DISPLAYING PRINT ATTRIBUTES USING AUGMENTED REALITY

(71) Applicant: Xerox Corporation, Norwalk, CT (US)

(72) Inventors: Dara Nanette Lubin, Pittsford, NY (US); Elizabeth Lee Barrese, Penfield, NY (US); Ron Edward Dufort, Rochester, NY (US); Matthew James Ochs, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,579

(22) Filed: Jan. 30, 2024

(65) Prior Publication Data

US 2024/0169602 A1 May 23, 2024

Related U.S. Application Data

(63) Continuation of application No. 17/648,005, filed on Jan. 14, 2022, now Pat. No. 12,008,680.

(51) Int. Cl.

| | |
|---|---|
| ***G06T 11/00*** | (2026.01) |
| ***G06K 7/14*** | (2006.01) |
| ***H04N 1/32*** | (2006.01) |

(52) U.S. Cl.

CPC ............ *G06T 11/00* (2013.01); *G06K 7/1417* (2013.01); *G06K 7/1443* (2013.01); *H04N 1/32138* (2013.01)

(58) Field of Classification Search

CPC .... G06F 3/1204; G06F 3/1205; G06F 3/1257; G06T 11/00; G06K 7/1443;

(Continued)

(56) References Cited

U.S. PATENT DOCUMENTS

| | | | |
|---|---|---|---|
| 7,126,618 | B2 | 10/2006 | Hirumi et al. |
| 7,453,471 | B2 | 11/2008 | Fukui |

(Continued)

FOREIGN PATENT DOCUMENTS

| | | | |
|---|---|---|---|
| EP | 2280378 | A1 | 2/2011 |
| EP | 3032490 | A1 | 6/2016 |

OTHER PUBLICATIONS

Kikuchi R, Yoshikawa S, Jayaraman PK, Zheng J, Maekawa T. Embedding QR codes onto B-spline surfaces for 3D printing. Computer-Aided Design. Sep. 1, 2018;102:215-23.*

(Continued)

*Primary Examiner* — Phu K Nguyen

(74) *Attorney, Agent, or Firm* — Simpson & Simpson, PLLC

(57) ABSTRACT

A method of automatically displaying a predetermined set of print attributes of a print job, the method including receiving an image of a first printed sheet, the first printed sheet including one or more at least partial machine-readable codes, the one or more at least partial machine-readable codes encoded with data related to the predetermined set of print attributes, decoding the data from the one or more at least partial machine-readable codes, determining if the data includes all of the print attributes in the predetermined set of print attributes, and if the data includes all of the print attributes in the predetermined set of print attributes, displaying the data using augmented reality (AR) over the first printed sheet.

20 Claims, 10 Drawing Sheets

(58) Field of Classification Search
CPC ......... G06K 7/1417; H04N 2201/3269; H04N 2201/3223; H04N 2201/3222; H04N 2201/3252; H04N 2201/3271; H04N 2201/3216; H04N 2201/326; H04N 2201/3212; H04N 2201/3221; H04N 2201/3276
USPC .......................................................... 345/418
See application file for complete search history.

(56) References Cited

U.S. PATENT DOCUMENTS

| | | | |
|---|---|---|---|
| 8,140,968 | B2 | 3/2012 | Tobioka |
| 8,477,360 | B2 | 7/2013 | Yoshitani |
| 8,559,030 | B2 | 10/2013 | Tsongas et al. |
| 9,036,173 | B2 | 5/2015 | Thomas et al. |
| 9,349,139 | B1 | 5/2016 | Gella et al. |
| 2005/0052695 | A1 | 3/2005 | Yoshitsugu et al. |
| 2007/0097437 | A1 | 5/2007 | Okada |
| 2008/0291490 | A1 | 11/2008 | Chabrol et al. |
| 2009/0268259 | A1 | 10/2009 | Hiroshi et al. |
| 2013/0027718 | A1 | 1/2013 | Fujii |
| 2019/0182392 | A1 | 6/2019 | Tokuchi |

OTHER PUBLICATIONS

Wan N, Zhang P, Liu Z, Li Z, Niu W, Rui X, Wang S, Seong M, He P, Liang S, Zhou J. Implantable QR code subcutaneous microchip using photoacoustic and ultrasound microscopy for secure and convenient individual identification and authentication. Photoacoustics. Jun. 1, 2023;31:100504.*

Song C, Li Z, Xu W, Zhou C, Jin Z, Ren K. My smartphone recognizes genuine QR codes! practical unclonable qr code via 3D printing. Proceedings of the ACM on Interactive, Mobile, Wearable and Ubiquitous Technologies. Jul. 5, 2018;2(2):1-20. (Year: 2018).

Lundstrom J, Verikas A, Tullander E, Larsson B. Assessing, exploring, and monitoring quality of offset colour prints. Measurement. May 1, 2013;46(4):1427-41.

* cited by examiner

Job Messages

| | |
|---|---|
| System Administrator | |
| Document Name: | NEW_13x19_2pVianne_6x9RetailV9_NA.pdf |
| Print Server Release: | CP.24.0.20111.1 4/28/2021 10:14:12 |
| Printer Type: | Xerox Baltoro HF Inkjet Press |
| Version Color: | 6.0.22 |
| Queue Name: | FFPSB7F5C_HOLD |
| Printer Name; | FFPSB7F5C (Windows 8 6.2.9200 E5-2687W) |
| Job Id: | 565 |
| Copies Requested: | 10 |
| Total Pages RIP'd: | 2 |
| Stock: | |
| Name: | Sappi EuroArt Plus Silk 801bTxt ! 12X18 |
| Size: | US12X18 (304.80 x 457.20)mm |
| Color: | white |
| Weight: | 118 gsm |
| Type: | Plain |
| Coating Type | Matte |
| Output: | |
| Sides Imaged: | 2 Sided |
| Stapling/Finishing: | No Finishing |
| Layout: | |
| LayoutStyle: | N-UP |
| Sheet Orientation: | Landscape |
| Rows Per Sheet: | 1 |
| Columns Per Sheet: | 1 |
| Layout Sequence: | Repeated |
| Gutter Margin: | 0.00 inch |
| Reduce/Enlarge: | Fit To Page |
| OutSide Margin: | 0.000 inch |
| Cut Marks: | Disabled |
| Trim: | Disabled |

FROM FIG. 1A

| | |
|---|---|
| PDF Processing: | Adobe PDF Print Engine |
| Image Quality: | |
| Print As Grayscale: | Disabled |
| Options: | |
| Black Overprint: | Disabled |
| PostScript Overprint: | Enabled |
| Anti–aliasing: | Disabled |
| Text and Graphics Enhancement: | Disabled |
| Trapping: | Disabled |
| Image Vector Trapping: | Disabled |
| User TRC: | None |
| Drop Size: | Large |
| Edge Enhancement: | Enabled |
| Input Color Setup | |
| RGB Color Space: | |
| Overrides: | Disabled |
| Use Embedded Profile: | Disabled |
| Images Profile: | sRGB |
| Text and Graphics Profile: | sRGB |
| CMYK Color Space: | |
| Overrides: | Disabled |
| Use Embedded Profile: | Disabled |
| Images Profile: | GRACoL 2006 Coated1v1 CMYK |
| Text and Graphics Profile: | GRACoL 2006 Coated1v2 CMYK |
| Gray Color Space: | |
| Images Profile: | Gamma 1_8 |
| Text and Graphics Profile: | XEROX BrenvaHD GRAY |
| Output Color Setup | |
| Color Mode: | Normal |
| Destination Profile: | Sappi Euro Art Plus Silk 80 lb Text_Large 214_April 2021 |
| RGB Rendering Intent: | |
| Overrides: | Disabled |
| Images: | Perceptual |
| Text: | Perceptual |
| Graphics: | Perceptual |

FROM FIG. 1B

| | |
|---|---|
| CMYK Rendering Intent: | |
| Overrides: | Disabled |
| Images: | Perceptual |
| Text: | Perceptual |
| Graphics: | Perceptual |
| Pure Primaries Images: | Off |
| Pure Primaries Graphics: | Off |
| Pure Primaries Text: | Off |
| Pantone Processing: | Enabled |
| Interpolation Method: | System Specified |
| PDL Settings: | |
| PDF Resolution (dpi): | 600x600 |
| Process Images at Half Resolution: | Disabled |
| Image Edit: | |
| Image Shift: | |
| Side 1 X: | 0.00 inch |
| Side 1 Y: | 0.00 inch |
| Side 2 X: | 0.00 inch |
| Side 2 Y: | 0.00 inch |

The online help contains information regarding the fields in this report.

FIG. 1C
PRIOR ART

SYSTEM AND METHOD FOR RETRIEVING AND DISPLAYING PRINT ATTRIBUTES USING AUGMENTED REALITY

CROSS-REFERENCE TO RELATED APPLICATIONS

This application claims priority to and the benefit of U.S. application Ser. No. 17/648,005, titled SYSTEM AND METHOD FOR RETRIEVING AND DISPLAYING PRINT ATTRIBUTES USING AUGMENTED REALITY, filed on Jan. 14, 2022, which is incorporated herein by reference in its entirety.

FIELD

The present disclosure relates to the field of printing systems, and more particularly, to automatic retrieval of print attributes of a print job, and even more particularly, to a system and method for automatically retrieving print attributes and displaying the print attributes over a sheet of a print job using augmented reality.

BACKGROUND

The attributes page associated with print jobs contains very useful information about the print job in production printing related to the print job attributes or characteristics, for example, the color profile selection which is critical on coated paper stocks. An example of a prior art attributes page showing print job attributes is shown in FIGS. 1A-C. The attributes page is printed following the print job. Print job attributes can be both qualitative (i.e., described using words) and/or quantitative (described using numbers). The operator or user can configure the print queue to always print the attributes page; however, the attributes page can still be separated from the rest of the print job and thus difficult to find. Once the print job is completed, if the user has not selected to print the attributes page, the user cannot go back and only print the attributes page, but must instead send the print job again. Moreover, a user that forgets to print the attributes page must review the job properties in the completed queue in order to double check key information about the print job, such as the color profile detected, the drop or particle size, the rendering intent (e.g., absolute, relative, perceptual, etc.), etc. However, the job ID file can be modified, so the completed queue job may not be the same as that one previously printed. Furthermore, current print attributes pages are simply a list that must be found and then compared to a sheet of a print job. This is difficult and time consuming.

Augmented reality (AR) is an interactive experience of a real-world environment where the objects that reside in the real world are enhanced by computer-generated perceptual information, sometimes across multiple sensory modalities, including visual, auditory, haptic, somatosensory and olfactory. AR can be defined as a system that incorporates three basic features: a combination of real and virtual worlds, real-time interaction, and accurate 3D registration of virtual and real objects. The overlaid sensory information can be constructive (i.e. additive to the natural environment), or destructive (i.e. masking of the natural environment). AR is used to enhance natural environments or situations and offer perceptually enriched experiences. With the help of advanced AR technologies (e.g. adding computer vision, incorporating AR cameras into smartphone applications and object recognition) the information about the surrounding real world of the user becomes interactive and digitally manipulated. Information about the environment and its objects is overlaid on the real world. This information can be virtual. AR is any experience which is artificial and which adds to the already existing reality.

Thus, there is a need for a system and method for system and method for retrieving print attributes and displaying such print attributes on a printed sheet of a print job using AR.

SUMMARY

According to aspects illustrated herein, there is provided a method of automatically displaying a predetermined set of print attributes of a print job, the method comprising receiving an image of a first printed sheet, the first printed sheet comprising one or more at least partial machine-readable codes, the one or more at least partial machine-readable codes encoded with data related to the predetermined set of print attributes, decoding the data from the one or more at least partial machine-readable codes, determining if the data includes all of the print attributes in the predetermined set of print attributes, and if the data includes all of the print attributes in the predetermined set of print attributes, and may include displaying the data using augmented reality (AR) over the first printed sheet.

In some embodiments, the image of the first printed sheet is received from a camera. In some embodiments, the method further comprises, if the data does not include all of the print attributes in the predetermined set of print attributes, displaying a message, and receiving an image of a second printed sheet. In some embodiments, the method further comprises receiving an input from a user, and based on the input, sending the decoded data to a print server. In some embodiments, the method further comprises receiving an input from a user, based on the input, updating the decoded data, and sending the updated decoded data to a print server. In some embodiments, the method further comprises, before the step of receiving the image of the first printed sheet, receiving an input from a user to enable AR displaying capability. In some embodiments, the method further comprises, before the step of receiving the image of the first printed sheet, encoding the data into the one or more at least partial machine-readable codes, and printing the one or more at least partial machine-readable codes on the first printed sheet. In some embodiments, the one or more at least partial machine-readable codes is arranged along an edge of the first printed sheet. In some embodiments, the one or more at least partial machine-readable codes comprise a plurality of partial machine-readable codes. In some embodiments, the step of decoding the data from the one or more at least partial machine-readable codes comprises reconstructing a full machine-readable code from the plurality of partial machine-readable codes, and decoding data from the full machine-readable code. In some embodiments, the machine-readable code is a quick response (QR) code. In some embodiments, the machine-readable code is selected from the group consisting of a barcode, a code number, and a recognizable image.

In some embodiments, the step of displaying the data using augmented reality (AR) over the first printed sheet comprises virtually displaying a list of the print attributes over the first printed sheet. In some embodiments, the step of displaying the data using augmented reality (AR) over the first printed sheet comprises virtually displaying the print attributes at specific locations over the first printed sheet, the specific location based in part on a printed image on the printed sheet. In some embodiments, the step of displaying the data using augmented reality (AR) over the first printed sheet comprises virtually displaying one or more objects representing the print attributes over the first printed sheet.

According to aspects illustrated herein, there is provided a system for automatically capturing and displaying a predetermined set of print attributes of a print job, the system comprising one or more computer processors, one or more computer readable storage media, a camera, and program instructions stored on the computer readable storage media for execution by at least one of the one or more computer processors, the program instructions comprising program instructions to receive an image of a first printed sheet, the first printed sheet comprising a printed image and one or more at least partial machine-readable codes encoded with data related to the predetermined set of print attributes, program instructions to decode the data from the one or more at least partial machine-readable codes, program instructions to determine if the decoded data includes all of the print attributes in the predetermined set of print attributes, and program instructions to, if the decoded data includes all of the print attributes in the predetermined set of print attributes, display the data using augmented reality (AR) over the first printed sheet.

In some embodiments, the program instructions further comprise program instructions to, if the decoded data does not include all of the print attributes in the predetermined set of print attributes, display a message, and program instructions to receive an image of a second printed sheet. In some embodiments, the program instructions further comprise program instructions to receive an input from a user, and program instructions to, based on the input, send the decoded data to a print server. In some embodiments, the program instructions further comprise program instructions to receive an input from a user, program instructions to, based on the input, update the decoded data, and program instructions to send the updated decoded data to a print server. In some embodiments, the program instructions further comprise program instructions to, before the step of receiving the image of the first printed sheet, encode the data into the one or more at least partial machine-readable codes, and program instructions to, print the one or more at least partial machine-readable codes on the first printed sheet. In some embodiments, the one or more at least partial machine-readable codes comprise a plurality of partial machine-readable codes, and the program instructions to decode the data from the one or more at least partial machine-readable codes comprises reconstructing a full machine-readable code from the plurality of partial machine-readable codes, and decoding data from the full machine-readable code. In some embodiments, the machine-readable code comprises at least one of a quick response (QR) code, a barcode, a code number, and a recognizable image.

According to aspects illustrated herein, there is provided a method of automatically detecting and displaying a predetermined set of print attributes of a print job, the method comprising receiving an image of a first printed sheet, the first printed sheet comprising a plurality of partial machine-readable codes, the plurality of partial machine-readable codes encoded with data related to the predetermined set of print attributes, reconstructing a full machine-readable code from the plurality of partial machine-readable codes, decoding the data from the full machine-readable code, determining if the decoded data includes all of the print attributes in the predetermined set of print attributes, and if the data includes all of the print attributes in the predetermined set of print attributes, displaying the data as objects and/or human-readable text using augmented reality (AR) over the first printed sheet.

According to aspects illustrated herein, there is provided a method for presenting print attributes of a print job, comprising converting alpha-numeric data associated with the attributes of the print job into a machine-readable code, printing the machine-readable code at one or more locations on at least one printed sheet of the print job, receiving an image of the at least one printed sheet, constructing the machine-readable code from the image, decoding the alpha-numeric data, and displaying the alpha-numeric data in an AR display viewed over the at least one printed sheet. In some embodiments the method further comprises uploading the alpha-numeric data to a print server to automatically apply the same settings (e.g., media, color profile, etc.) to another job.

According to aspects illustrated herein, there is provided an application with augmented reality to automate attributes page information.

In some embodiments, the attributes data is encoded into one or more machine-readable codes, for example a quick response (QR) code, barcode, code number, recognizable image (i.e., a diagnostic image, service image, logo, etc.). In some embodiments, the machine-readable codes comprise invisible ink. The machine-readable codes are printed on at least one sheet of the print job, for example, near the edge of the sheet. In some embodiments, the machine-readable codes are printed on every sheet of the print job. In some embodiments, the machine-readable codes are printed on the non-printed area of the sheets, or run along the entire edge of the sheet. When the user runs a camera, for example of a computing device such as a smart phone, over the printed sheet, the program uses AR to display the job attributes in front of or overlaying the printed sheet.

In some embodiments, multiple machine-readable codes are printed around the printed sheet, for example, along the edges of the sheet. The program is operatively arranged to scan the entirety of the printed sheet and at the multiple machine-readable codes such that, even if they are cut off or partial, based on enough of the partials the program gathers a full set of information about the job attributes. If the user would like to reuse the print attributes of a print job, the user may send the print attributes, via the program, to a server so a new print job can be programmed according to such attributes. In some embodiments, the user may also change one or more of the print attributes.

The present disclosure automatically captures print job attributes data and embeds it into machine-readable code on the sheet. The program uses augmented reality that allows a user to immediately retrieve the print job attribute data when holding a camera over a printed sheet of the print job. The present disclosure provides cost savings due to fewer sheets utilized, a simplified process for the user (the user does not need to remember to select the print attributes page or change the print queue), and the print job information embedded in the print job itself in case the attributes page is misplaced.

According to aspects illustrated herein, there is provided a method to automatically provide the attributes data of a print job, hidden in a machine-readable code, on every sheet of the print job, displaying the job attributes of the print job via a camera-based application using AR, and sending the attributes data to a print server (e.g., XEROX® FREEFLOW® print server) to automatically program the required job attributes for a subsequent print job.

According to aspects illustrated herein, there is provided a mobile application with AR technology to analyze an output page with QR codes in the page boundaries. The application is able to piece together truncated QR codes on the page and assemble a whole QR code. Using the QR code, the application overlays the detailed set of print attributes used to produce the output on top of the physical output sheet as well as align relevant attributes to the physical page content that applies. This detail can then be used to verify and easily reproduce the same content or allow for modifications knowing all the original print job attributes used. The present disclosure allows for the capture of large amounts of configuration data on each output page in QR code format, and the ability to piece together partial QR codes and use AR technology to overlay the output results on a physical media sheet.

According to aspects illustrated herein, there is provided a method of placing machine-readable code on otherwise unmarked portions of printed sheets, often the edge, that contain information about the job itself (i.e., print attributes). In some embodiments, this information comprises detail about the media, the job programming parameters, the printing device's information, the specifics about the ink/toner and placement, etc. The user can hold their phone or other apparatus over the machine-readable code and view these details to learn about the job. With this information, the user can then recreate the job or, if the source is still available on the print server, to make alterations to the job. The present disclosure allows a user to understand the job without any additional sheets that define the job such that it can be recreated or compared with other output parameters. The present disclosure intelligently presents information in the context the user is viewing (e.g., stock details when viewing background, text rendering information when focusing on text, etc.). In some embodiments, the machine-readable code is printed in the trim margin of the sheet. The present disclosure can be extended to not only provide in-context information but also supporting analysis/suggestions, and aid in problem solving and optimizing user scenarios.

According to aspects illustrated herein there is provided a system and method for retrieving and displaying print attributes using augmented reality. Print job attributes in the form of alpha-numeric data is encoded into a machine-readable code. The machine-readable code is printed in multiple places in trim areas of a printed sheet. Due to page/image registration, some of the codes may be too close to the edge of the print and be cut off. Pieces of the machine-readable code are extracted from around the printed sheet and reconstructed as a single machine-readable code. The data in the machine-readable code is decoded and displayed as human-readable text in an AR display, viewed right over the printed sheet. The data is then uploaded to the print server to automatically apply the same settings (e.g., media, color profile, etc.) to another print job.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which:

FIGS. 1A-C show a prior art attributes page;

DETAILED DESCRIPTION

Figure 2:
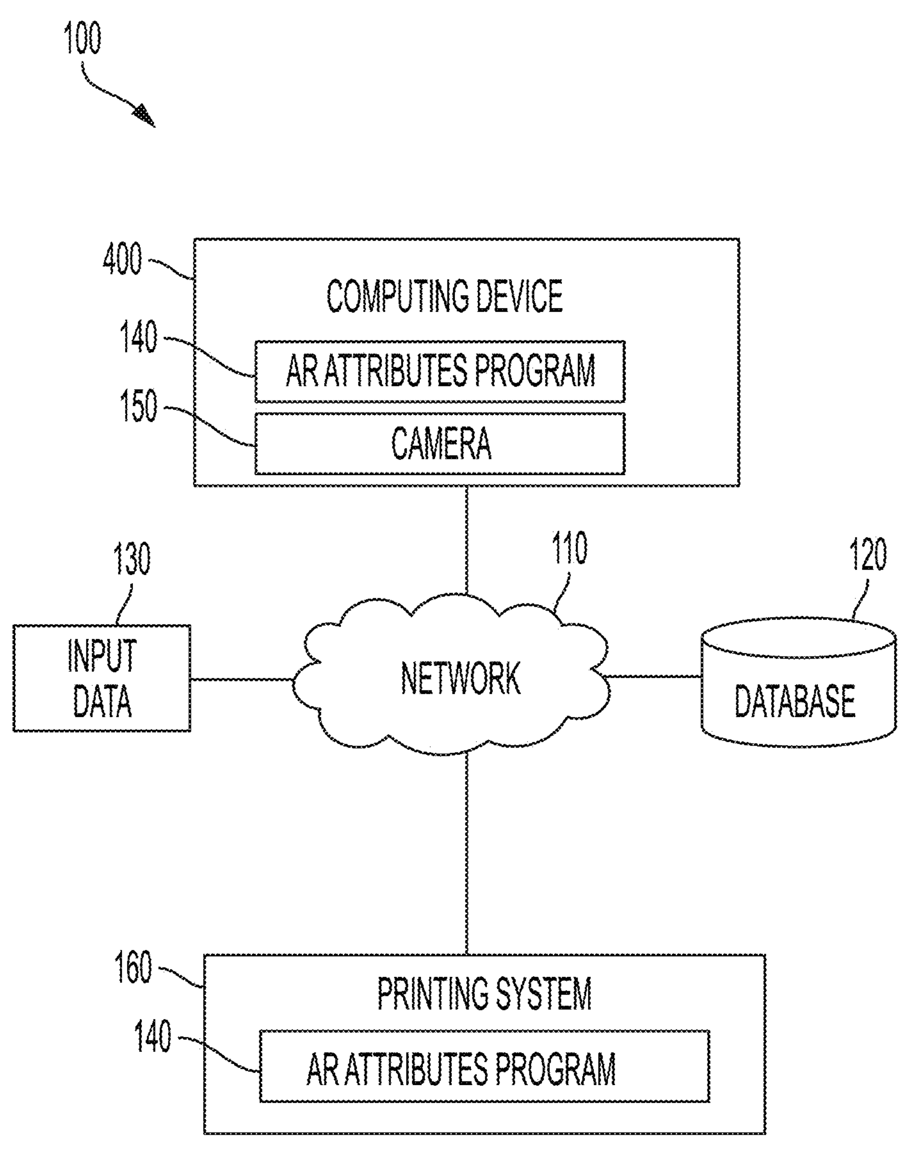
FIG. 2 is a functional block diagram illustrating an environment, in accordance with some embodiments of the present disclosure.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein.

"Printer," "printer system," "printing system," "printer device," "printing device," and "multi-functional device (MFD)" as used herein encompass any apparatus, such as a digital copier, bookmaking machine, facsimile machine, multi-function machine, etc., which performs a print outputting function for any purpose.

As used herein, "sheet," "web," "substrate," "printable substrate," and "media" refer to, for example, paper, transparencies, parchment, film, fabric, plastic, photo-finishing papers, or other coated or non-coated substrate media in the form of a web upon which information or markings can be visualized and/or reproduced. By specialty sheet it is meant a sheet which includes a card, label, sticker, pressure seal envelopes, mailers, or other element that is thicker than the substrate on or in which it resides.

"Printed sheet" as used herein is a sheet on which an image is printed as part of the print job.

"Attributes" or "print job attributes" of a print job as used herein refers to qualitative and/or quantitative data related to the characteristics of that specific print job. Examples of these characteristics are shown in FIGS. 1A-C. As shown in FIGS. 1A-C, the print job attributes may relate to characteristics of the stock (e.g., size, color, weight, coating type, etc.), output (e.g., double sided, stapling, etc.), layout (e.g., landscape, portrait, margin, etc.), image quality (e.g., grayscale, drop size, color scheme/setup), CMYK rendering intent, etc.

"Decode" as used herein refers to the conversion of data from a code, such as a machine-readable code, to human-readable objects and/or text. Put another way, the decoding of a machine-readable code (e.g., QR code) translates the information therein into something that can be easily understood by humans.

Referring now to the figures, FIG. 2 is a functional block diagram illustrating an AR attributes environment, generally environment 100, in accordance with some embodiments of the present disclosure. FIG. 2 provides only an illustration of one implementation, and does not imply any limitations with regard to the environments in which different embodiments may be implemented. Many modifications to the depicted environment may be made by those skilled in the art without departing from the scope of the disclosure as recited by the claims. In some embodiments, environment 100 includes computing device 400, database 120, user input data 130, and printing system 160 all of which are connected to network 110. In some embodiments, environment 100 further comprises camera 150, which may be included on or a separate component from computing device 400. In some embodiments, environment 100 may further comprise or communicate with a print server or central controller, which communicates with printing device 160 (and other printing devices) regarding print jobs. The central controller is the interface between a digital front end for job information, or free flow controller software, and the various relevant components of printing system 160 (hardware), and can be a machine logic controller (e.g., power supply in package controller). In an example embodiment, the central controller is a XEROX® FREEFLOW® print server.

Network 110 can be, for example, a local area network (LAN), a wide area network (WAN) such as the Internet, or a combination of the two, and can include wired, wireless, or fiber optic connections.

Computing device 400 may be a hardware device that produces augmented images based on information received from database 120, input data 130, printing system 160, and/or camera 150 using AR attributes program 140. Computing device 400 is capable of communicating with network 110, database 120, input data 130, printing system 160, camera 150, and in some embodiments, a print server. In some embodiments, computing device 400 may include a computer. In some embodiments, computing device 400 may include internal and external hardware components, as depicted and described in further detail with respect to FIG. 7. In some embodiments, AR attributes program 140 is implemented on a web server, which may be a management server, a web server, or any other electronic device or computing system capable of receiving and sending data. The web server can represent a computing system utilizing clustered computers and components to act as a single pool of seamless resources when accessed through a network. The web server may include internal and external hardware components, as depicted and described in further detail with respect to FIG. 7.

AR attributes program 140 is primarily installed on computing device 400, although it may additionally be installed on printing system 160. AR attributes program 140 is operatively arranged to decode data from one or more machine-readable codes printed on a printed sheet, the data related to the print job attributes. AR attributes program 140 is capable of piecing together information from multiple partial machine-readable codes to create and decode a full machine-readable code, as will be described in greater detail below. AR attributes program 140 is operatively arranged to then display the data via AR on a graphic user interface (GUI) of computing device 400 such that it overlays the printed sheet. The display may be in the form of overlaying a list of print job attributes on the printed sheet, or placing specific print job attributes of data at specific locations. For example, the stock color (e.g., white), may be placed on a portion of the sheet that does not include ink. As such, a user can zoom in on the GUI, for example at a portion of the sheet with no marking material, and determine that the stock color is white. AR attributes program 140 is also arranged to, at the request of the user, send the data related to the print job attributes to a print server such that it can be used for a subsequent print job. In some embodiments, AR attributes program is arranged to receive an input from a user altering the print job attributes and then sending the data associated with the altered print job attributes to the print server.

AR attributes program 140 is operatively arranged to encode data into machine-readable codes. For example, AR attributes program 140 receives an input from the user, for example via input data 130, related to a print job that the user wishes to enable AR attributes capability. AR attributes 140 then encodes the print job attributes associated with the print job into a machine-readable code (e.g., QR code, barcode, code number, recognizable image such as a diagnostic/service image, etc.) and prints it at one or more locations on one or more printed sheets. In some embodiments, printing system 160 may be preprogrammed to encode print job attributes as machine-readable code.

Database 120 is a central storage for print attributes. For example, database 120 may include every print attribute that could be utilized for any print job. AR attributes program 140 may communicate with database 120 to reference data from the machine-readable code to a corresponding print job attribute. Database 120 may also include data related to various display preferences. For example, a user may select a list form AR display wherein a two-dimensional print job attribute list overlays the printed sheet, a locational AR display wherein print job attributes are arranged at specific locations on the printed sheet, a three-dimensional AR display wherein print job attributes protrude from or float over the printed sheet. Database 120 can be implemented using any non-volatile storage medium known in the art. For example, authentication database can be implemented with a tape library, optical library, one or more independent hard disk drives, or multiple hard disk drives in a redundant array of independent disks (RAID).

Input data 130 is data inputted by a user, for example, an input to enable/disable AR attributes capability, an input to send decoded print job attribute data to a print server, an input to alter print job attributes and send data related to the altered print job attributes to a print server, an input to select an AR display setting, for example, saved in database 120, etc.

Figure 3:
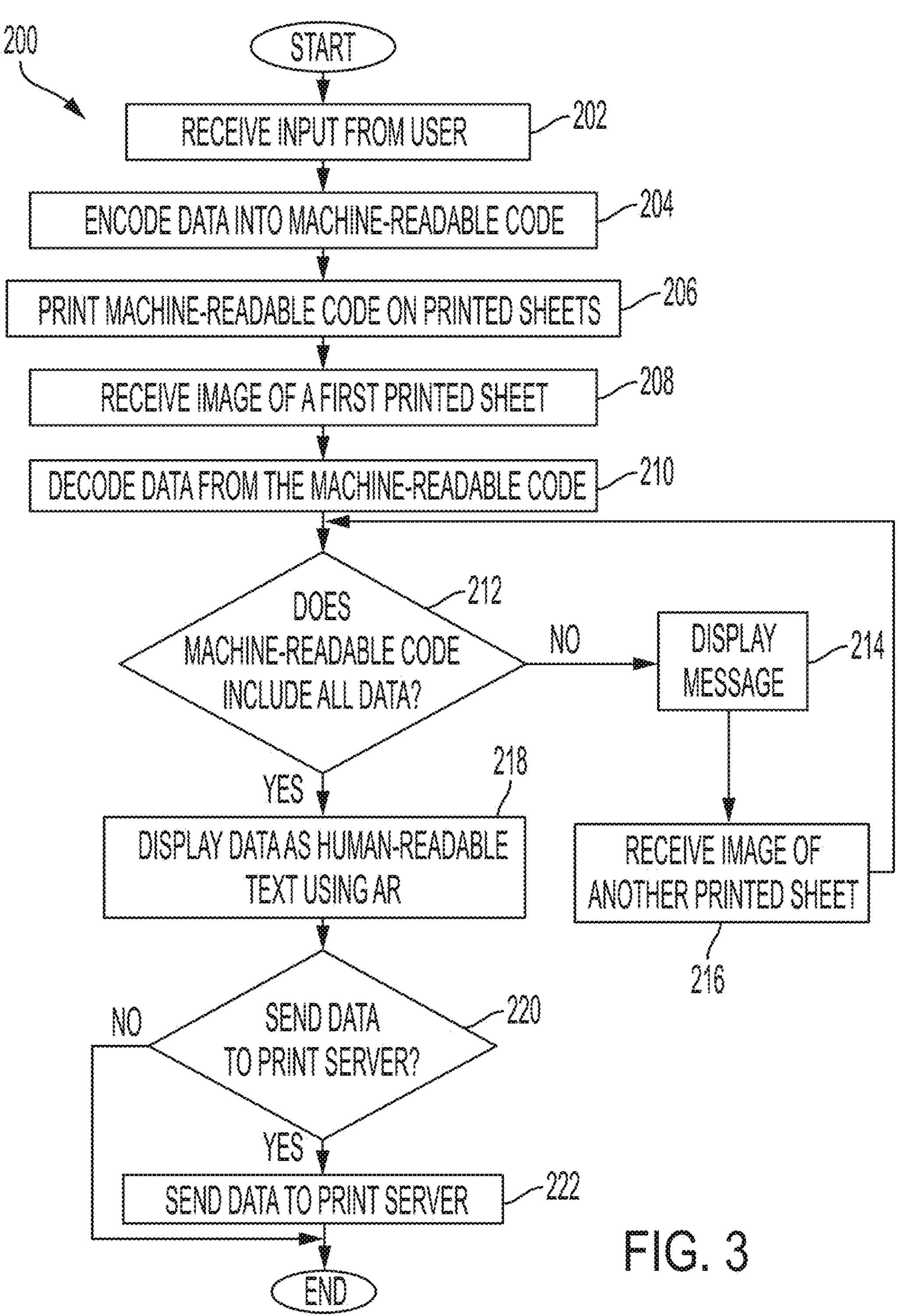
FIG. 3 is a flow chart depicting operational steps for displaying print attributes using augmented reality.

FIG. 3 shows flow chart 200 depicting operational steps for displaying print attributes using augmented reality, in accordance with some embodiments of the present disclosure.

In step 202, AR attributes program 140 receives an input from a user related to a print job, wherein the input enables the AR attributes capability for that print job. The print job comprises print job attributes (see FIGS. 1A-C) associated therewith. The print job comprises one or more printed sheets.

In step 204, AR attributes program 140 encodes the data associated with the print job attributes into a print attribute identifier, for example, a machine-readable code. The machine-readable code may be any suitable format, for example, a QR code, barcode, code number, etc. In some embodiments, the print attribute identifier is a recognizable image such as a diagnostic/service image. For example, certain images can be assigned to print attribute configurations that are common such that AR attributes program 140 can determine from the recognizable image that a certain set of print job attributes are being used, or at least some of the print job attributes being used.

Figure 4:
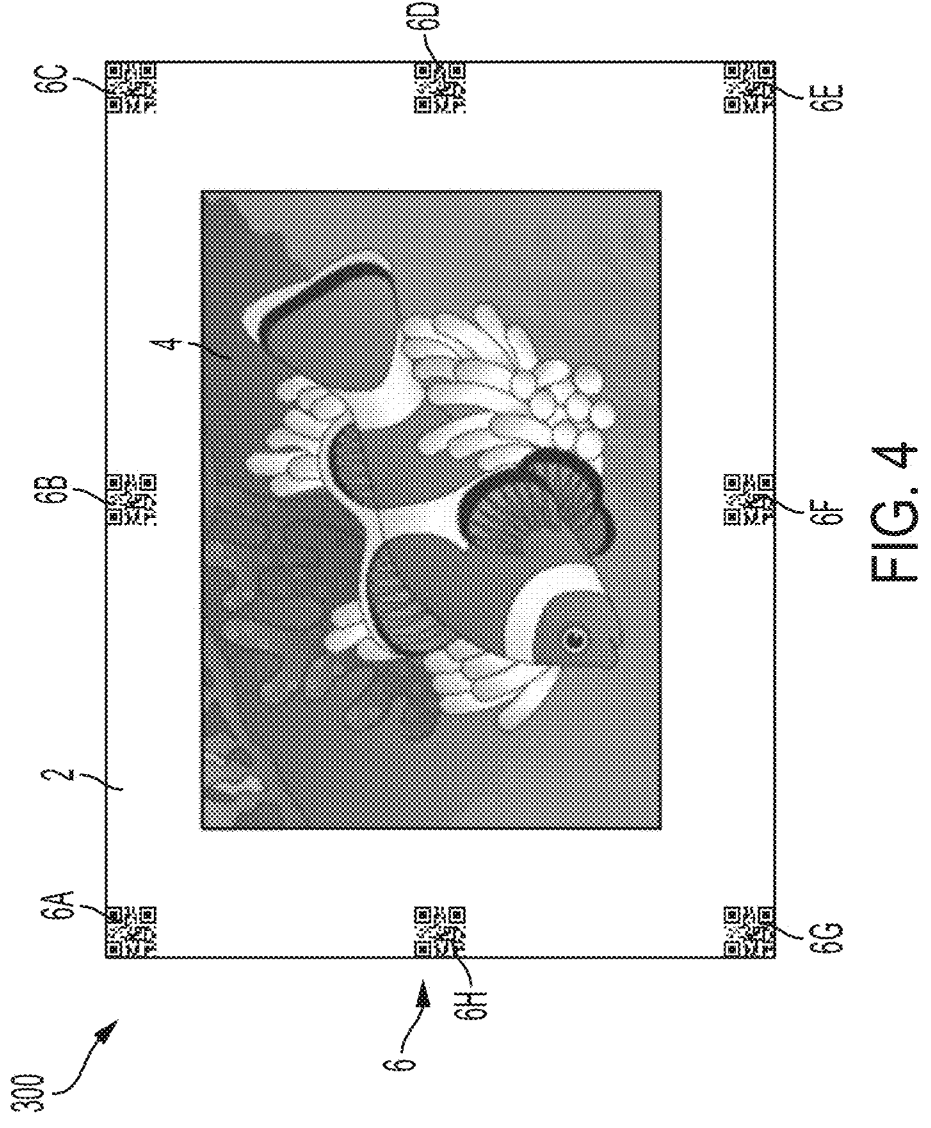
FIG. 4 is a elevational view of a printed sheet.

In step 206, AR attributes program 140 prints the machine-readable code on the printed sheets. For example, printing system 160 prints both the image of the print job and the machine-readable code on the same sheet. In some embodiments, the machine-readable code is printed in trim areas of the sheet (i.e., along the edges of the sheet outside of the imaged area) so as not to interfere with the printed image of the print job. In some embodiments, the machine-readable code is printed in multiple places on the sheet. In some embodiments, the machine-readable code is printed as a plurality of partial machine-readable codes at multiple places on the sheet. As shown in FIG. 4, printed sheet 300 comprises sheet 2, printed image 4, and a plurality of partial machine-readable codes 6, for example, machine-readable codes 6A-H. In some embodiments, the machine-readable code is printed in invisible ink such that it does not affect the appearance of the image printed on the sheet. In some embodiments, the machine-readable code comprises a technique for making data hard for casual detection, such as yellow microdots. In some embodiments, the machine-readable code is part of the design of the print job, for example, embedded in the image of the print job. In some embodiments, the machine-readable code comprises optical character recognition (OCR), wherein the same code could be both human-readable and machine-readable. For example, machine-readable code 6 may comprise images of typed, handwritten, or printed text that is readable by humans and also convertible/readable by camera 150 of computing device 400 such that AR attributes program 140 overlays the print job attributes on a printed sheet as described herein.

In step 208, AR attributes program 140 receives an image of a first printed sheet of the print job, for example, via camera 150. As is known in the art, a user may scan printed sheet 300 with a camera of a computing device such as a smart phone in order to capture information thereon, namely, machine-readable codes 6A-H. It should be appreciated that, in some embodiments, AR attributes program 140 receives an image from a camera or scanner of printing system 160. That image could be sent to computing device 400 (e.g., a mobile device, tablet, etc.), a standard personal computer or laptop, or a user interface on printing system 160, which then displays the decoded objects/text over a printed sheet.

In step 210, AR attributes program 140 decodes data from the one or more machine-readable codes 6. For example, if there is no one full machine-readable code on printed sheet 300, AR attributes program 140 will reconstruct a full machine-readable code utilizing a plurality of machine-readable codes 6. For example, AR attributes program 140 may use the top left portion of machine-readable code 6E, the top right portion of machine-readable code 6H, the bottom right portion of machine-readable code 6B, and the bottom left portion of machine-readable code 6C in order to reconstruct one full machine-readable code 6. AR attributes program 140 decodes data from a full machine-readable code 6 and determines the print job attributes. In some embodiments, and as described above, AR attributes program 140 compares the decoded data with print job attribute data in database 120 in order to accurately determine the print job attributes of the instant print job. For example, AR attributes program 140 looks up the data that is encoded in the fields. In some embodiments, AR attributes program 140 determines from the layout of printed sheet 300 that certain print job attributes are associate therewith. For example, AR attributes program 140 may detect a very common layout in the print job and thus determine the print job attributes associated therewith from, for example, saved print job attributes associated with that layout saved in database 120.

In step 212, AR attributes program 140 determines if the machine-readable code includes all data corresponding to a print job. For example, as per print job attribute data in database 120, the machine-readable code should include data for each field of print job attributes.

If, in step 212, AR attributes program 140 determines that the machine-readable code does not include all data corresponding to the instant print job attributes, then in step 214 AR attributes program 140 displays a message indicating that there is not enough data available. The message may also direct the user to try scanning another printed sheet.

In step 216, AR attributes program 140 receives an image of another printed sheet, for example a subsequent printed sheet. The program then proceeds to step 212 to determine if the machine-readable code includes all data corresponding to the instant print job attributes.

Figure 5:
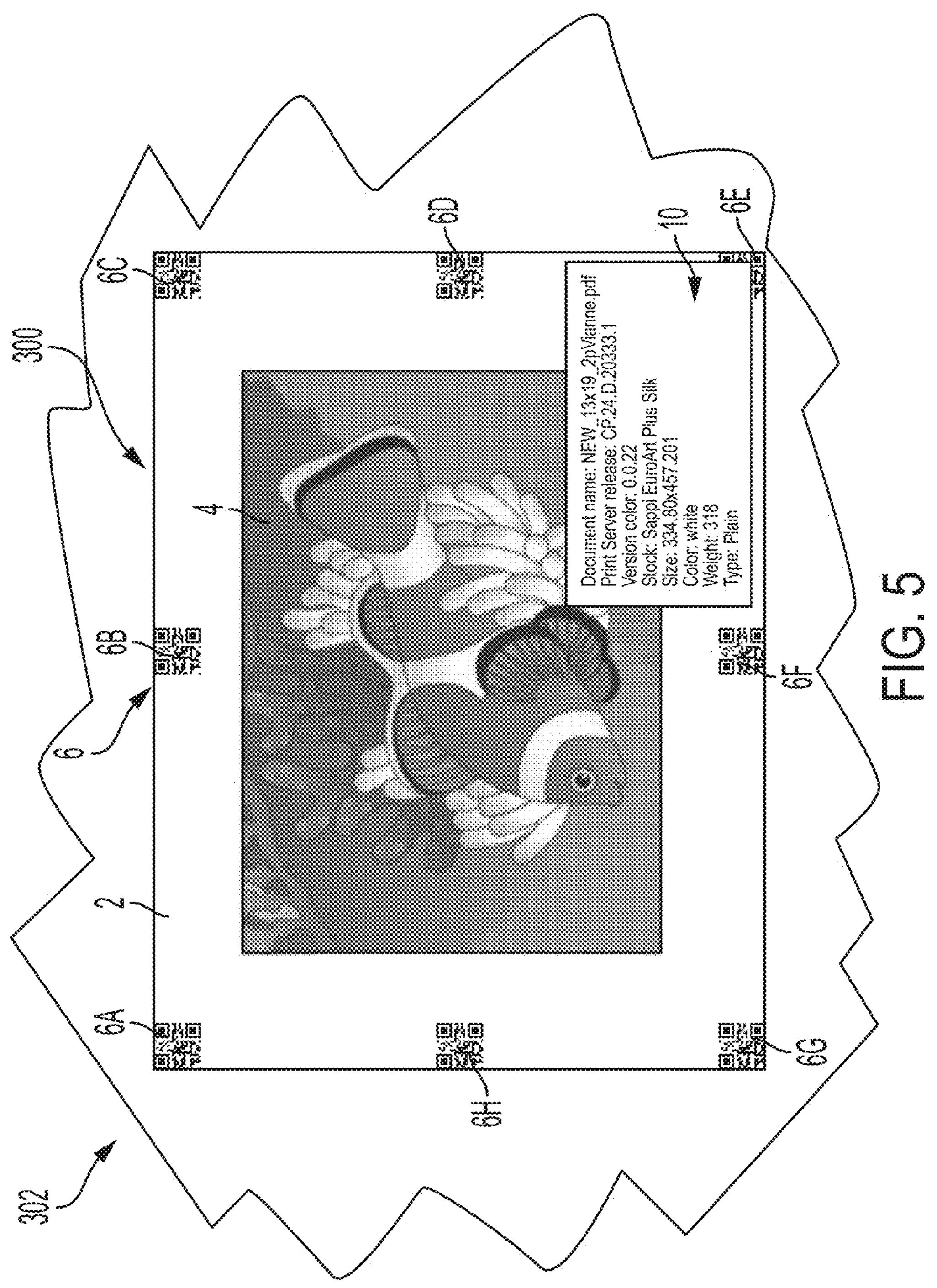
FIG. 5 is a front view of a portion of a display screen showing an embodiment of an icon of an application.
Figure 6:
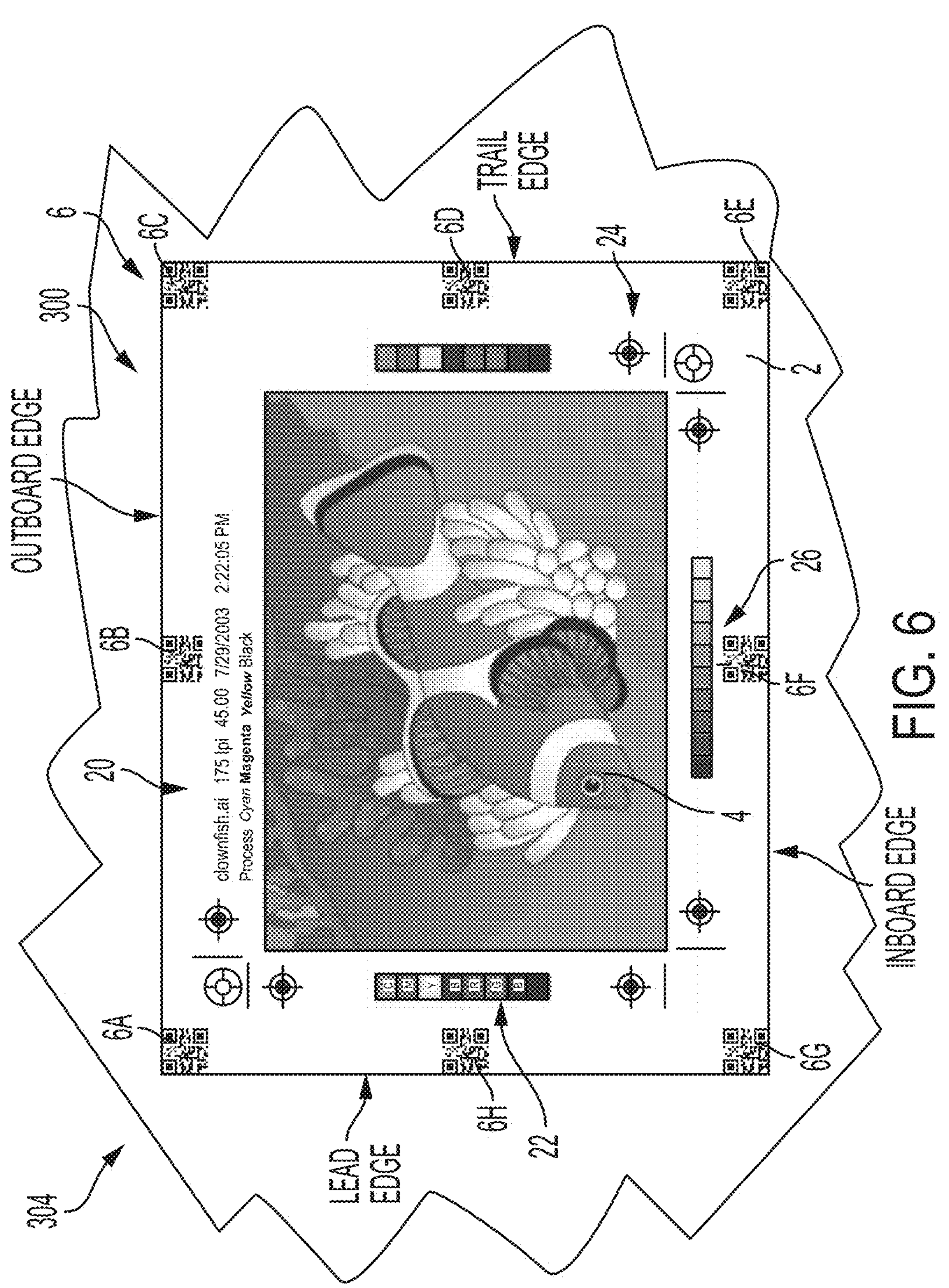
FIG. 6 is a front view of a portion of a display screen showing an embodiment of an icon of an application.

If, in step 212, AR attributes program 140 determines that the machine-readable code includes all data related to the instant print job attributes, then in step 218 AR attributes program 140 displays the print job attribute data as objects and/or human-readable text using AR. As shown in FIG. 5, a portion of display screen (e.g., GUI) 302 is shown which shows print job attributes 10 overlaying printed sheet 300 in list form. Print job attributes 10 shows only a portion of the total print job attributes. In some embodiments, a user may scroll the list of print job attributes 10 to see more print job attributes. As shown in FIG. 6, a portion of display screen (e.g., GUI) 304 is shown which shows print job attributes overlaying printed sheet 300 in specific locations thereon. For example, print job attributes 20 indicate, inter alia, the document name, the printing resolution, and the date and time of the print server release. Print job attributes 22 show histograms indicating color separations. The color histograms 22 are arranged nearest a colored portion of printed image 4. Print job attributes 26 show histograms indicating grayscale separations. The grayscale histograms 26 are arranged nearest a grayscale portion of printed image 4. This allows a user to compare the colors of printed image 4 to the print job attribute colors (i.e., the colors that were supposed to be printed vs. the colors that were actually printed) to detect error. Other print job attributes can be similarly arranged for easy comparison by the user, for example, the stock color can be arranged outside the imaged area. In some embodiments, diagnostic or service images 24 are also arranged on printed sheet 300. These diagnostic images have known specific color targets, densities, line weights, etc. that could be automatically recognized by AR attributes program 140, and used in conjunction with programmed attributes, for detailed information to help a service person. Other features may be overlaid on printed sheet 300 using AR, for example, the lead edge, trail edge, outboard edge, and inboard edge of printed sheet 300. A user may use such orientation elements, for example the orientation of sheet 2 at first pass (i.e., of the print head), to determine the cause of any printing defects (e.g., smudged ink, creasing, bent corners, etc.). The AR display may include arrows, menus, dials, etc. in two-dimensional form or in three-dimensional form (e.g., protruding from or floating above printed sheet 300). In some embodiments, the AR display may include objects such as arrows and histograms to represent the metadata or attributes about the printed page.

Figure 8:
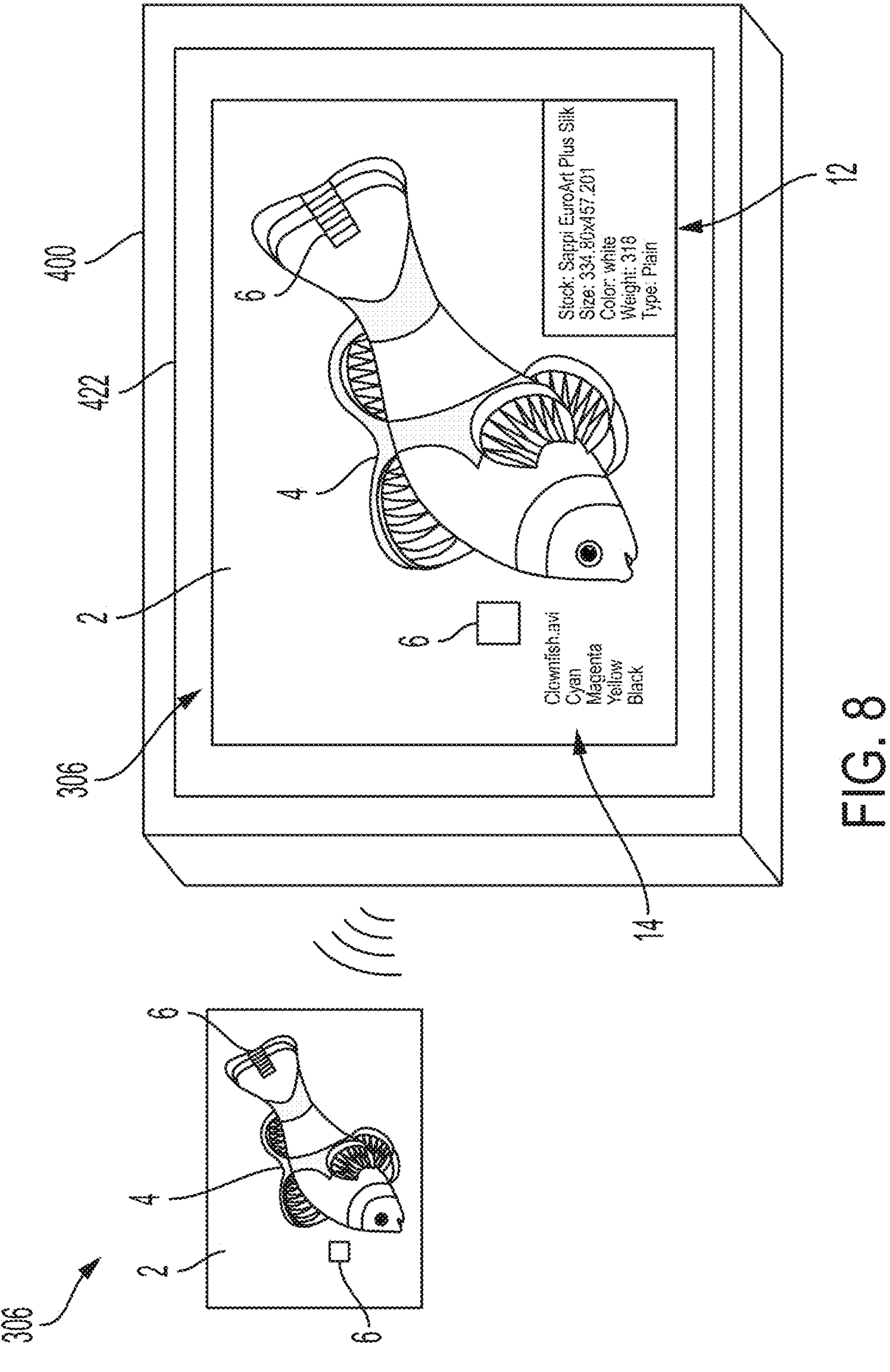

In another example, FIG. 8 shows computing device 400 including display 422 taking an image, either stored or live, of printed sheet 306. Printed sheet 306 comprises sheet 2, printed image 4, and one or more machine-readable codes 6, for example a machine-readable code that is embedded in printed image 4 and a machine-readable code 6 that is arranged proximate to printed image 4. Using AR attributes program 140, computing device 400 virtually displays print job attributes 12 and 14 over the image of printed sheet 306 shown on display 422.

In step 220, AR attributes program 140 determines if the user would like to send the data for print job attributes to the print server to apply those print job attributes to a subsequent print job. This query may be in the form of an AR button wherein a user presses the button on the GUI of computing device 400 to initiate sending the print job attributes.

In some embodiments, in step 220, AR attributes program 140 further determines if the user would like to alter any of the print job attributes prior to sending the data to the print server. For example, if a user determines that the printed color profile does not match that of the intended color profile, the user can change the attribute using AR attributes program 140 prior to sending such data to the print server. In some embodiments, AR attributes program 140 automatically analyzes the programmed attributes vs. the printed attributes to detect any differences therebetween. If there is an error then it can easily be fixed, either automatically by AR attributes program 140 or manually by the user.

In some embodiments, in an additional step, AR attributes program 140 provides AR buttons to emulate different printing devices. For example, the user can press various AR buttons on the GUI of computing device 400 to view, via AR overlay, what the printed image would look like if printed on a different printing device, with a different color profile, on a different stock color or coating, dot pattern, etc. In some embodiments, the emulation buttons allow a user to view the print according to different standards or press formats, for example, SWOP Press (emulates U.S. press standards using the specification for web offset publications), Euroscale Press (emulates the Euroscale 4-color process press mode), Commercial Press (emulates a 4-color process commercial press mode), SNAP Press (emulates standards for printing on uncoated and newsprint papers using the specifications for non-heat advertising printing), Japan Color (emulates Japan Color 2001 specifications), ISO Coated and ISO Uncoated (emulates FOGRA 27L and 29L specifications), etc.

In step 222, AR attributes program 140 sends the data associated with the print job attributes or the altered print job attributes to the print server and automatically applies the attributes to a subsequent print job.

Figure 7:
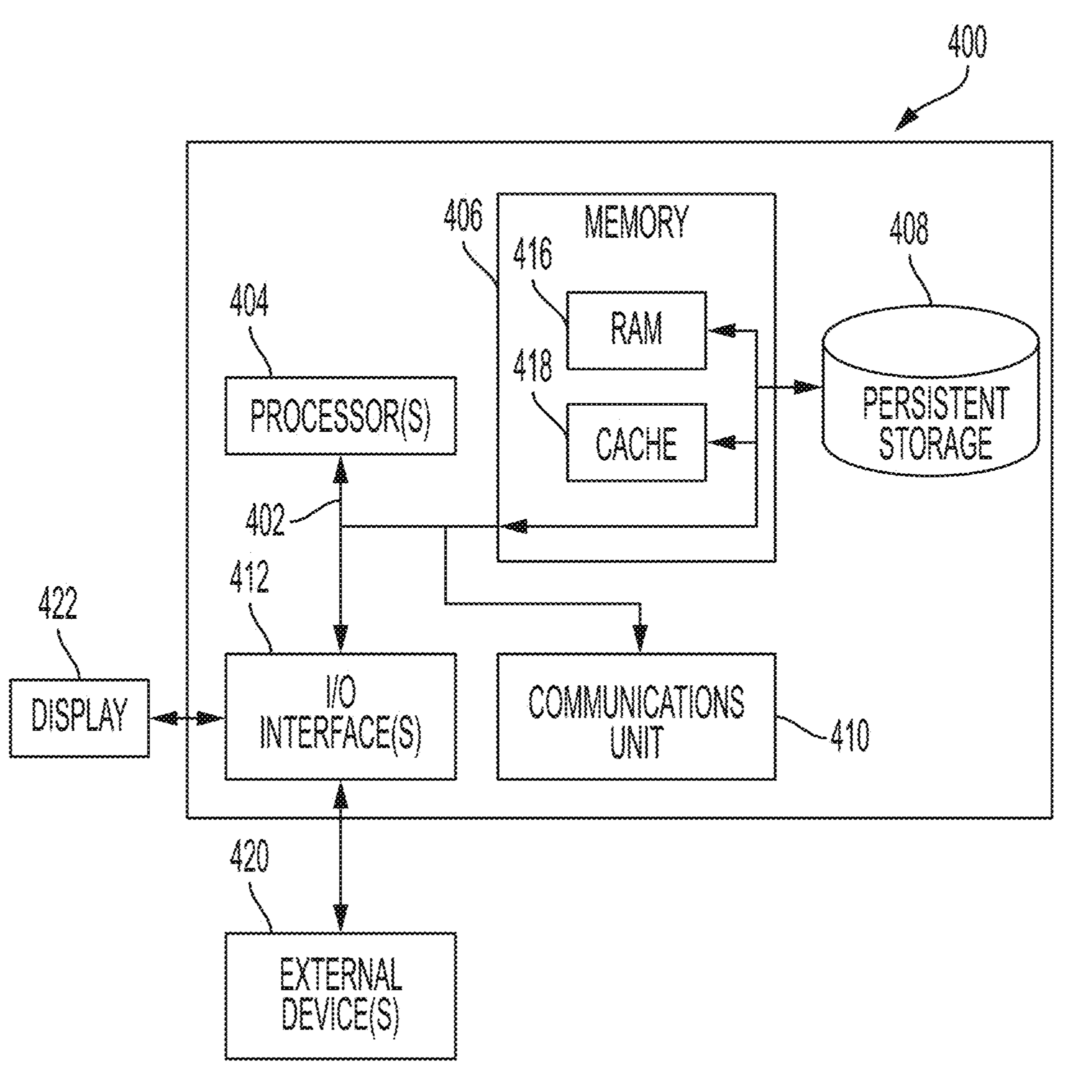
FIG. 7 is a block diagram of internal and external components of a computer system, in accordance with some embodiments of the present disclosure; and, FIG. 8 is a perspective view of a computing device overlaying virtual objects on an image of a printed sheet.

FIG. 7 is a block diagram of internal and external components of computer system 400, which is representative of the computing device of FIG. 2, in accordance with some embodiments of the present disclosure. It should be appreciated that FIG. 7 provides only an illustration of one implementation and does not imply any limitations with regard to the environments in which different embodiments may be implemented. In general, the components illustrated in FIG. 7 are representative of any electronic device capable of executing machine-readable program instructions. Examples of computer systems, environments, and/or configurations that may be represented by the components illustrated in FIG. 7 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

Computing device 400 includes communications fabric 402, which provides for communications between one or more processing units 404, memory 406, persistent storage 408, communications unit 410, and one or more input/output (I/O) interfaces 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 416 and cache memory 418. In general, memory 406 can include any suitable volatile or non-volatile computer readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 410 provides for communications with other computer systems or devices via a network. In this exemplary embodiment, communications unit 410 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present disclosure can be downloaded to computing device 400 through communications unit 410 (i.e., via the Internet, a local area network, or other wide area network). From communications unit 410, the software and data can be loaded onto persistent storage 408.

One or more I/O interfaces 412 allow for input and output of data with other devices that may be connected to computing device 400. For example, I/O interface 412 can provide a connection to one or more external devices 420 such as a keyboard, computer mouse, touch screen, virtual keyboard, touch pad, pointing device, or other human interface devices. External devices 420 can also include portable computer readable storage media such as, for example, thumb drives, portable optical or magnetic disks, and memory cards. I/O interface 412 also connects to display 422.

Display 422 provides a mechanism to display data to a user and can be, for example, a computer monitor. Display 422 can also be an incorporated display and may function as a touch screen, such as a built-in display of a tablet computer.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

2 Sheet
4 Printed image
6 Machine-readable codes
6A Machine-readable code
6B Machine-readable code
6C Machine-readable code
6D Machine-readable code
6E Machine-readable code
6F Machine-readable code
6G Machine-readable code
6H Machine-readable code
10 Print job attributes
12 Print job attributes
14 Print job attributes
20 Print job attributes
22 Print job attributes
24 Diagnostic or service images
26 Print job attributes
100 Augmented reality (AR) attributes environment
110 Network
120 Database
130 Input data
140 Augmented reality (AR) attributes program
150 Camera
160 Printing system
200 Flowchart
202 Step
204 Step
206 Step
208 Step
210 Step
212 Step
214 Step
216 Step
218 Step
220 Step
300 Printed sheet
302 Portion of display screen
304 Portion of display screen
306 Printed sheet
400 Computing device
402 Communications fabric
404 Processing units
406 Memory
408 Persistent storage
410 Communications unit
412 Input/output (I/O) interfaces
416 Random access memory (RAM)
418 Cache memory
420 External device(s)
422 Display

What is claimed is:

1. A method of automatically displaying print attributes of a print job, the method comprising:

receiving an image of at least one printed sheet comprising one or more at least-partial machine-readable codes, the one or more at least-partial machine-readable codes encoded with data related to the print attributes;

decoding the data from the one or more at least partial machine-readable codes, the data having at least one or more of the data related to print job attributes and display-preference data;

determining if the data includes sought print attributes;

piecing together information from the one or more at least partial machine-readable codes to create and decode a full machine-readable code adapted to include the sought print attributes; and, if the data includes the sought print attributes, displaying the data.

2. The method as recited in claim 1, further comprising:

receiving an input from a user; and, based on the input, sending the decoded data to a print server.

3. The method as recited in claim 1, further comprising:
receiving an input from a user;
based on the input, updating the decoded data; and,
sending the updated decoded data to a print server.

4. The method as recited in claim 1, further comprising:
before the step of receiving the image of the at least one printed sheet, encoding the data into the one or more at least partial machine-readable codes; and,
printing the one or more at least partial machine-readable codes onto the at least one printed sheet.

5. The method as recited in claim 4, wherein the one or more at least partial machine-readable codes is arranged along at least one edge of the at least one printed sheet.

6. The method as recited in claim 4, wherein the one or more at least partial machine-readable codes is disposed on a portion of the at least one printed sheet that does not otherwise include ink.

7. The method as recited in claim 1, further including displaying the data using augmented reality (AR).

8. A system for automatically capturing and displaying print attributes of a print job, the system comprising:
one or more computer processors;
one or more computer readable storage media;
at least one camera; and,
program instructions stored on the computer-readable storage media for execution by at least one of the one or more computer processors, the program instructions comprising:
program instructions adapted to receive an image of one or more printed sheets, the one or more printed sheets including one or more at least partial machine-readable codes encoded with data related to the print attributes;
program instructions to decode the data from the one or more at least partial machine-readable codes;
program instructions to determine if the decoded data includes sought print attributes;
program instructions adapted to piece together information from the one or more at least multiple partial machine-readable codes, the program instructions further adapted to create and decode a full machine-readable code adapted to include the sought print attributes; and,
program instructions to, if the decoded data includes the sought print attributes, display the data.

9. The system as recited in claim 8, wherein:
the one or more at least partial machine-readable codes comprise a plurality of partial machine-readable codes; and,
the program instructions to decode the data from the one or more at least partial machine-readable codes is:
further adapted to reconstruct a full machine-readable code from the plurality of partial machine-readable codes; and,
adapted to decode data from the full machine-readable code.

10. The system as recited in claim 8, wherein the program instructions further comprise:
program instructions to receive an input from a user; and,
program instructions to, based on the input, send the decoded data to a print server.

11. The system as recited in claim 8, wherein the program instructions further comprise:
program instructions to receive an input from a user;
program instructions to, based on the input, update the decoded data; and,
program instructions to send the updated decoded data to a print server.

12. The system as recited in claim 8, wherein the program instructions further comprise:
program instructions to, before the step of receiving the image of the at least one printed sheet, encode the data into the one or more at least partial machine-readable codes; and,
program instructions to, print the one or more at least partial machine-readable codes on the at least one printed sheet.

13. The system as recited in claim 12, wherein the one or more at least partial machine-readable codes is adapted to be arranged along at least one edge of the at least one printed sheet.

14. The system as recited in claim 12, wherein the one or more at least partial machine-readable codes is adapted to be arranged on a portion of the at least one printed sheet that does not otherwise include ink.

15. The system as recited in claim 8, wherein the system is further adapted to display the data using augmented reality (AR).

16. A method of automatically detecting and displaying print attributes of a print job, the method comprising:
receiving an image of one or more printed sheets, the one or more printed sheets comprising a plurality of partial machine-readable codes, the plurality of partial machine-readable codes encoded with data related to the print attributes;
reconstructing a full machine-readable code from the plurality of partial machine-readable codes, the plurality of partial machine-readable codes each disposed on at least one separate location on the at least one printed sheet;
decoding the data from the full machine-readable code;
decoding the data, therefore, from the plurality of partial machine-readable codes, the data having at least one or more of the data related to print job attributes and display-preference data;
determining if the decoded data includes—the sought print attributes in the predetermined set of print attributes; and,
if the data includes the sought print attributes, displaying the data.

17. The method as recited in claim 16, further comprising:
before the step of receiving the image of the at least one printed sheet, encoding the data into the one or more at least partial machine-readable codes; and,
printing the one or more at least partial machine-readable codes onto the at least one printed sheet.

18. The method as recited in claim 17, wherein the one or more at least partial machine-readable codes is arranged along at least one edge of the at least one printed sheet.

19. The method as recited in claim 17, wherein the one or more at least partial machine-readable codes is disposed on a portion of the at least one printed sheet that does not otherwise include ink.

20. The method as recited in claim 16, further including displaying the data using augmented reality (AR).

* * * * *